United States Patent
Gross et al.

(10) Patent No.: US 10,984,106 B2
(45) Date of Patent: Apr. 20, 2021

(54) USING EMI FINGERPRINTS TO DETECT MALICIOUS CRYPTOMINING SOFTWARE

(71) Applicant: Oracle International Corporation, Redwood Shores, CA (US)

(72) Inventors: Kenny C. Gross, Escondido, CA (US); Andrew J. Lewis, Litchfield, NH (US); Guang C. Wang, San Diego, CA (US); Michael H. S. Dayringer, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 239 days.

(21) Appl. No.: 16/419,861

(22) Filed: May 22, 2019

(65) Prior Publication Data
US 2020/0202000 A1   Jun. 25, 2020

Related U.S. Application Data

(60) Provisional application No. 62/782,182, filed on Dec. 19, 2018.

(51) Int. Cl.
| | |
|---|---|
| *G06F 21/56* | (2013.01) |
| *G06F 11/30* | (2006.01) |
| *G01R 29/08* | (2006.01) |

(52) U.S. Cl.
CPC ....... *G06F 21/567* (2013.01); *G01R 29/0892* (2013.01); *G06F 11/3058* (2013.01); *G06F 21/564* (2013.01); *G06F 21/566* (2013.01)

(58) Field of Classification Search
CPC .. G06F 21/567; G06F 11/3058; G06F 21/564; G06F 21/566; G06F 11/3003; G06F 11/3466; G06F 21/73; G06F 21/552; G01R 29/0892
See application file for complete search history.

(56) References Cited

U.S. PATENT DOCUMENTS

| | | | | |
|---|---|---|---|---|
| 8,762,080 B2 * | 6/2014 | Vaidyanathan | ..... | G06F 11/3051 702/58 |
| 2010/0332199 A1 * | 12/2010 | Dhanekula | .......... | G06F 11/3093 703/2 |

OTHER PUBLICATIONS

"Malicious Traffic Detection Using Traffic Fingerprint"—Shimoni etal, Arnon.dk, Jan. 2015 https://arnon.dk/wp-content/uploads/2015/01/Malicious-traffic-detection-using-traffic-fingerprint.pdf (Year: 2015).*
"DySign: Dynamic Fingerprinting for the Automatic Detection of Android Malware"—Karbab et al, Concordia University, Feb. 19, 2017 https://arxiv.org/pdf/1702.05699.pdf (Year: 2017).*

* cited by examiner

*Primary Examiner* — Randy A Scott
(74) *Attorney, Agent, or Firm* — Park, Vaughan, Fleming & Dowler LLP

(57) ABSTRACT

The disclosed embodiments provide a system that detects execution of malicious cryptomining software in a target computing system. During operation, the system monitors target electromagnetic interference (EMI) signals generated during operation of the target computing system. Next, the system generates a target EMI fingerprint from the target EMI signals. The system then compares the target EMI fingerprint against a set of malicious EMI fingerprints for different pieces of malicious cryptomining software to determine whether the target computing system is executing malicious cryptomining software.

20 Claims, 3 Drawing Sheets

USING EMI FINGERPRINTS TO DETECT MALICIOUS CRYPTOMINING SOFTWARE

RELATED APPLICATION

This application claims priority under 35 U.S.C. § 119 to U.S. Provisional Application No. 62/782,182, entitled "Method and Apparatus for Malicious-Software-Exploit Detection for Enhanced Security of Oracle Cloud Systems" by the same inventors as the instant application, filed on 19 Dec. 2018, the contents of which are incorporated by reference herein.

BACKGROUND

Field

The disclosed embodiments generally relate to techniques for detecting malicious software in computing systems. More specifically, the disclosed embodiments relate to a technique that uses electromagnetic interference (EMI) fingerprints obtained by monitoring electromagnetic emissions from an enterprise computer system to detect malicious cryptomining software.

Related Art

Cryptomining is a process by which transactions for various forms of cryptocurrency are verified and added to an associated blockchain digital ledger. Whenever a cryptocurrency transaction takes place, a cryptocurrency miner is responsible for ensuring the authenticity of information and updating the blockchain with the transaction. This process is extremely computationally intensive.

Cryptocurrency usage has grown exponentially in the past few years, which has caused cryptominers to fill makeshift datacenters with computer servers to perform such cryptomining operations. However, the significant electrical power consumed by such data centers has created capacity problems in local utility grids, which has caused some municipalities to ban such cryptomining activities.

Some cryptominers have begun to use malicious software to surreptitiously harness computing systems belonging to other people for cryptomining purposes. This has become a problem for cloud-computing providers, which often offer free trials for prospective customers with a very simple signup process. Cryptominers have created a lucrative business model in which they purchase stolen credit card numbers, and then create fake small-business credentials and open "free-trial-period" cloud accounts. These free cloud accounts are then used to perform CPU-intensive cryptomining computations, which significantly increase workloads for cloud-computing providers and consume a significant amount of electricity.

To deal with this problem, cloud-computing providers are beginning to employ administrators to identify and close such malicious accounts. For example, these system administrators can examine cloud customer virtual machines that have very high CPU utilizations, and decide which customer workloads look suspicious enough to warrant further investigation. This process is extremely time-consuming, and is also problematic because: (1) legitimate cloud customers often run high-performance workloads, which have high CPU utilizations; and (2) malicious cryptominers are often able to evade detection by time-slicing their cryptomining computations among multiple maliciously generated accounts to stay under a utilization threshold, and to thereby escape detection.

Hence, what is needed is a technique for automatically detecting malicious cryptomining software without the above-described drawbacks of existing manual malicious cryptomining detection techniques.

SUMMARY

The disclosed embodiments provide a system that detects execution of malicious cryptomining software in a target computing system. During operation, the system monitors target electromagnetic interference (EMI) signals generated during operation of the target computing system. Next, the system generates a target EMI fingerprint from the target EMI signals. The system then compares the target EMI fingerprint against a set of malicious EMI fingerprints for different pieces of malicious cryptomining software to determine whether the target computing system is executing malicious cryptomining software.

In some embodiments, while generating the target EMI fingerprint from the EMI signals, the system performs a Fast Fourier Transform (FFT) operation on the target EMI signals to transform the target EMI signals from a time-domain representation to a frequency-domain representation. Next, the system partitions an output of the FFT operation into a set of frequency bins. The system then constructs an amplitude time-series signal for each frequency bin in the set of frequency bins. Finally, the system generates the target EMI fingerprint by combining the amplitude time-series signals for all of the frequency bins in the set of frequency bins.

In some embodiments, while comparing the target EMI fingerprint against each malicious EMI fingerprint in the set of malicious EMI fingerprints, the system computes a bivariate normalized cross power spectral density (NCPSD) between the target fingerprint and the malicious EMI fingerprint. If the computed bivariate NCPSD exceeds a predefined threshold, the system determines that a piece of malicious cryptomining software associated with the malicious EMI fingerprint is executing on the target computing system.

In some embodiments, prior to monitoring the EMI signals, the system generates the set of EMI fingerprints. During this process, for each of the different pieces of malicious cryptomining software, the system executes the piece of malicious cryptomining software on a golden system while all other processes in the golden system are suspended. Next, the system gathers malicious EMI signals generated by the golden computing system while the piece of malicious cryptomining software is executing. Finally, the system generates a malicious EMI fingerprint for the piece of malicious cryptomining software from the gathered EMI signals.

In some embodiments, after gathering the malicious EMI signals for a given piece of malicious cryptomining software and prior to generating the associated malicious fingerprint, the system trains a Multivariate State Estimation Technique (MSET) model on the malicious EMI signals. Next, the system uses the trained MSET model to produce MSET estimates for the malicious EMI signals, wherein the MSET estimates are less noisy than the original malicious EMI signals. Finally, the system uses the MSET estimates while generating the associated malicious fingerprint.

In some embodiments, the EMI signals are monitored using an insertable device, which is inserted into the target computing system to gather the EMI signals from the target computing system.

In some embodiments, the insertable device gathers the target EMI signals through ground lines or other signal lines in the target computing system, or through a fixed antenna structure in the insertable device, which is optimized for a specific frequency range.

In some embodiments, the insertable device comprises one of the following: a universal serial bus (USB) dongle, which is insertable into a USB port in the target computing system; a peripheral component interconnect (PCI) card, which is insertable into a PCI slot in the target computing system; or a hard-disk drive (HDD) filler package, which is insertable into an HDD slot in the target computing system In some embodiments, the insertable device includes a software-defined radio (SDR) for communicating the target EMI signals with a data-acquisition unit.

DETAILED DESCRIPTION

Figure 1A:
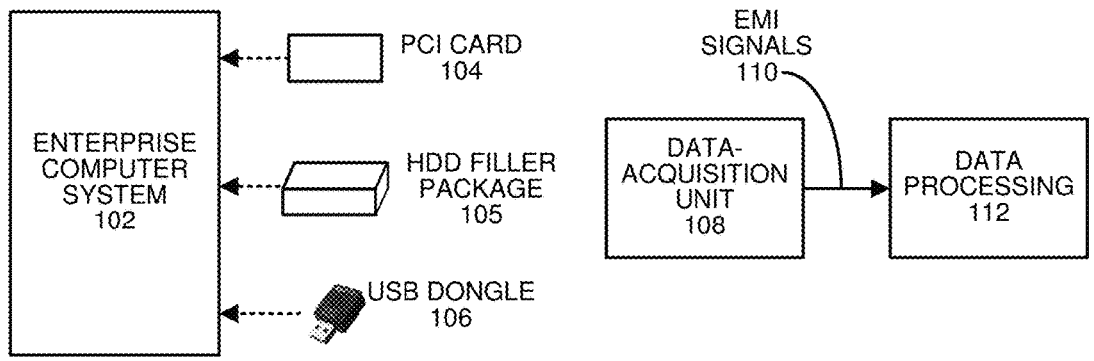
FIG. 1A illustrates a data-acquisition system that gathers EMI signals from a computing system in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Details

During operation, the disclosed embodiments gather EMI signals emitted from a target computer system using one or more internal or external antennae. Next, the frequency spectrum of the gathered signals, which typically ranges from 500 KHz to 1.5 GHz, is divided into N equally spaced "frequency bins," wherein N can, for example, be 20. The spectral activity in each of the N bins is averaged and then the N bins are converted into N time-series signals, which are monitored using an advanced nonlinear, nonparametric (NLNP) machine-learning pattern-recognition technique called the "Multivariate State Estimation Technique" (MSET). Although it is advantageous to use MSET for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR). The purpose of using MSET for the EMI-fingerprint-generation use case is completely different from other use cases for MSET in prognostic-surveillance systems. In these other prognostic-surveillance use cases, an MSET model is trained on a "normal" system with no degradation, and the MSET model is then used to detect incipient anomalies in a system under surveillance.

In contrast, in the EMI-fingerprint-generation use case, an MSET model is used to de-noise the N time-series signals. More specifically, an MSET model is trained to learn patterns of interaction among the N frequency bins. Next, the trained MSET model is used to estimate each signal based on the learned correlation patterns among all other N-1 signals. This has the effect of "de-noising" the signals because MSET estimates are known to be more accurate than the raw signals.

We generate EMI fingerprints for malicious cryptomining code by running the malicious cryptomining code and suspending all other processes on a golden system so that only the malicious cryptomining code is active. EMI data is then gathered over a number of minutes (e.g., 10 minutes) and is processed to create N frequency-binned time-series signals, which are de-noised using MSET.

These de-noised time-series signals are used to generate an EMI fingerprint, which is subsequently compared against an EMI fingerprint generated by a target computing system during a surveillance mode using a bivariate NCPSD computation. Note that this comparison operation is "bivariate" because it compares a frequency signal from a stored fingerprint with a frequency signal from a system under surveillance. For example, suppose $signal_1$ in a 20-signal EMI fingerprint is associated with a frequency bin from 50-55 MHz. Assume that we store 10 minutes of $signal_1$. Then, for the target system under surveillance, we maintain a trailing history window of 10 minutes of time-series signals. At every time step, we compute an NCPSD between the stored $signal_1$ for the EMI fingerprint and data in the same frequency bin (from 50-55 MHz) for the 10-minute trailing history window.

Note that if the repetitive periodic elements of the stored EMI fingerprint signal match the repetitive periodic elements in the trailing history window, then the NCPSD will have significant non-zero contributions at the same locations in the frequency domain as corresponding peaks in the stored signal for each individual frequency bin in the stored EMI fingerprint. This is true even if the repetitive periodic elements are contaminated with extraneous noise (e.g., if there are other concurrent processes running on the system under surveillance.)

Alternatively, if no malicious cryptomining software is being executed in the target system under surveillance, even if the target system is fully loaded executing other computational workloads, the NCPSD will be close to zero for all frequencies. Note that we can set a threshold on the NCPSD, which is calibrated to achieve an overall security goal confidence factor. For example, if we want to have 99.9% confidence that a set of cloud servers are not running any malicious cryptomining software, we can set a threshold (e.g., 0.24) on the NCPSD. In this way, datacenter personnel can achieve a desired confidence factor by adjusting the NCPSD threshold appropriately.

Before describing our new technique further, we first describe an exemplary system in which it operates.

System that Gathers EMI Signals

FIG. 1A illustrates a data-acquisition system that gathers EMI signals from a computer system in accordance with the disclosed embodiments. As illustrated in FIG. 1A, EMI signals can be gathered using one of a number of possible insertable devices, such as: a PCI card 104, which is insertable into a PCI slot in the target computing system; an HDD filler package 105, which is insertable into an HDD slot in the target computing system; and a USB dongle 106, which is insertable into a USB port in the target computing system. Note that, when inserted, each of these insertable devices 104-106 is electrically coupled to a ground plane or other signal line of enterprise computer system 102 (or includes a fixed antenna structure, which is optimized for a specific frequency range) to gather EMI signals 110 from enterprise computing system 102. The gathered EMI signals 110 are then communicated to a data-acquisition unit 108, which feeds the EMI signals 110 into a data processing unit 112 for further processing.

In some embodiments, the insertable device is implemented as a two-part device comprising a primary part and a secondary part, wherein there are at least two possible implementations for the primary part, and the secondary part is optional. The primary part can be implemented as either: (1) an antenna, or (2) a direct electrical connection to an existing line in the system, which we can observe as if it were an antenna. The optional secondary part can be some type of active module, which includes a radio-frequency (RF) receiver and an analog-to-digital converter (ADC), to perform functions, such as: frequency tuning, demodulation, mixing, sampling, conversion, and reporting. Note that this secondary part is optional in the insertable device because the same functions can alternatively be implemented outside of the server, which means the functions do not have to be implemented inside the insertable device.

System that Generates EMI Fingerprints for Malicious Software

Figure 1B:
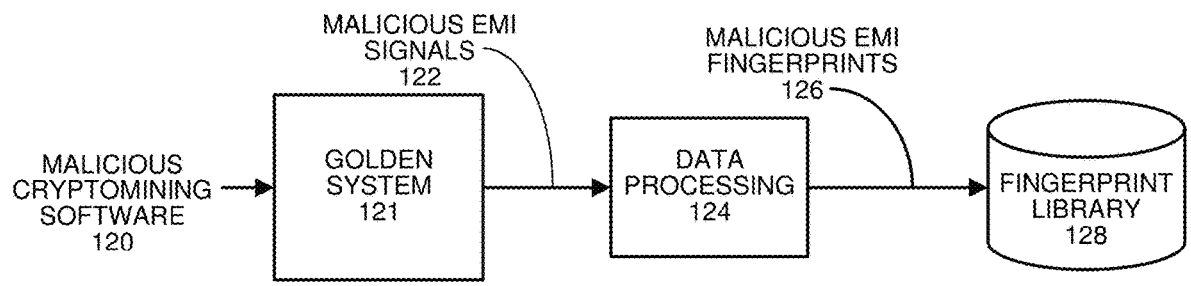
FIG. 1B illustrates a system that generates and stores EMI fingerprints for malicious cryptomining software in accordance with the disclosed embodiments.

FIG. 1B illustrates a system that generates and stores EMI fingerprints for malicious cryptomining software in accordance with the disclosed embodiments. As illustrated in FIG. 1B, a number of different pieces of malicious cryptomining software 120 are executed on a golden system 121 to generate malicious EMI signals 122. These malicious EMI signals 122 are gathered using the techniques described with reference to FIG. 1A, and are then fed into data processing unit 124, which performs various operations to produce corresponding malicious EMI fingerprints 126. (These operations are described in further detail below with reference to the flow charts in FIG. 2 and FIG. 5.) Finally, the malicious EMI fingerprints 126 are stored in a fingerprint library 128.

System that Detects EMI Fingerprints for Malicious Software

Figure 1C:
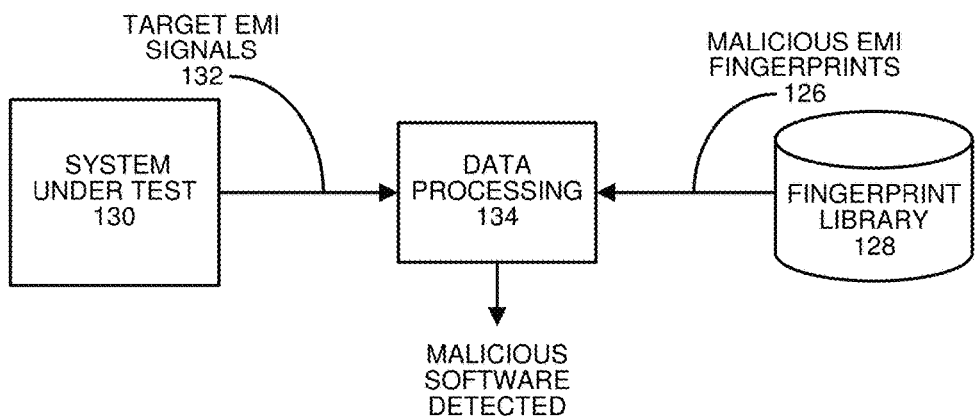
FIG. 1C illustrates a system that detects malicious cryptomining software based on EMI fingerprints in accordance with the disclosed embodiments.

FIG. 1C illustrates a system that detects malicious cryptomining software based on EMI fingerprints in accordance with the disclosed embodiments. As illustrated in FIG. 1C, a system under test 130 generates target EMI signals 132, which are gathered using the techniques described with reference to FIG. 1A, and are fed into data processing unit 134. Data processing unit 134 generates a target EMI fingerprint (not shown) from target EMI signals 132, and this target EMI fingerprint is compared against malicious EMI fingerprints 126 from fingerprint library 128. (These fingerprint-generation and fingerprint-comparison operations are described in further detail below with reference to the flow charts that appear in FIGS. 2-4.)

Process of Detecting Malicious Cryptomining Software

Figure 2:
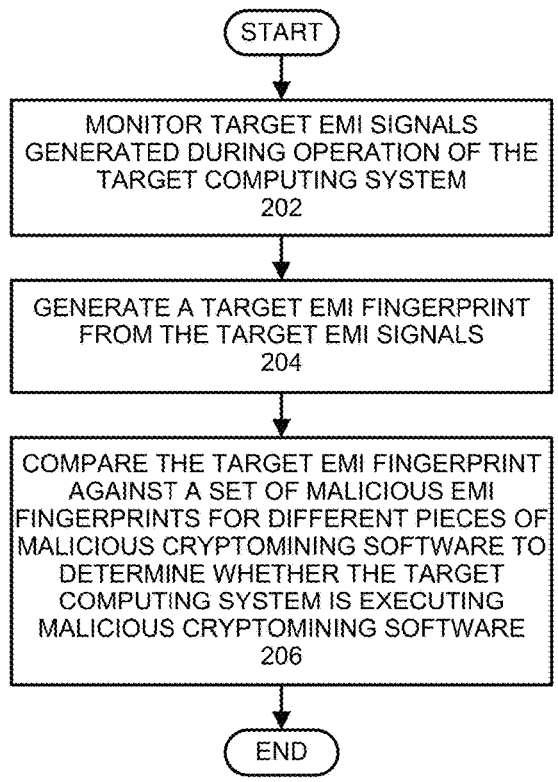
FIG. 2 presents a flow chart illustrating a process for detecting execution of malicious cryptomining software in a computing system in accordance with the disclosed embodiments.

FIG. 2 presents a flow chart illustrating a process for detecting execution of malicious cryptomining software in a computing system in accordance with the disclosed embodiments. During operation, the system monitors target EMI signals generated during operation of the target computing system (step 202). Next, the system generates a target EMI fingerprint from the target EMI signals (step 204). The system then compares the target EMI fingerprint against a set of malicious EMI fingerprints for different pieces of malicious cryptomining software to determine whether the target computing system is executing malicious cryptomining software (step 206).

Figure 3:
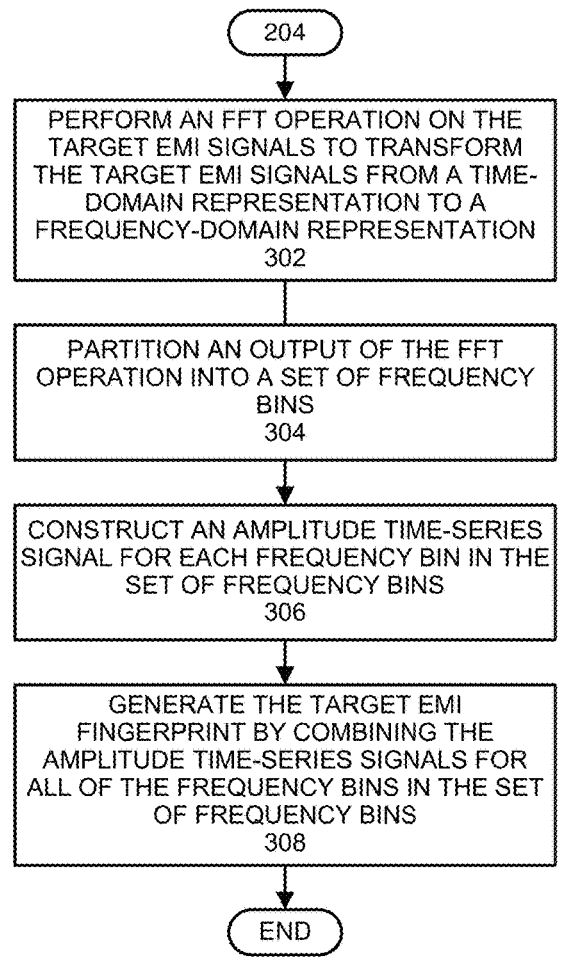
FIG. 3 presents a flow chart illustrating a process for generating a target EMI fingerprint from target EMI signals in accordance with the disclosed embodiments.

FIG. 3 presents a flow chart illustrating a process for generating a target EMI fingerprint from EMI signals in accordance with the disclosed embodiments. (This flow chart illustrates in more detail the operations performed in step 204 in the flow chart that appears in FIG. 2.) During this process, the system first performs an FFT operation on the target EMI signals to transform the target EMI signals from a time-domain representation to a frequency-domain representation (step 302). Next, the system partitions an output of the FFT operation into a set of frequency bins (step 304). The system then constructs an amplitude time-series signal for each frequency bin in the set of frequency bins (step 306). (As mentioned above, this can involve averaging the spectral activity in each of the N bins, and then converting the averaged spectral activity for the N bins into N time-series signals.) Finally, the system generates the target EMI fingerprint by combining the amplitude time-series signals for all of the frequency bins in the set of frequency bins (step 308).

Figure 4:
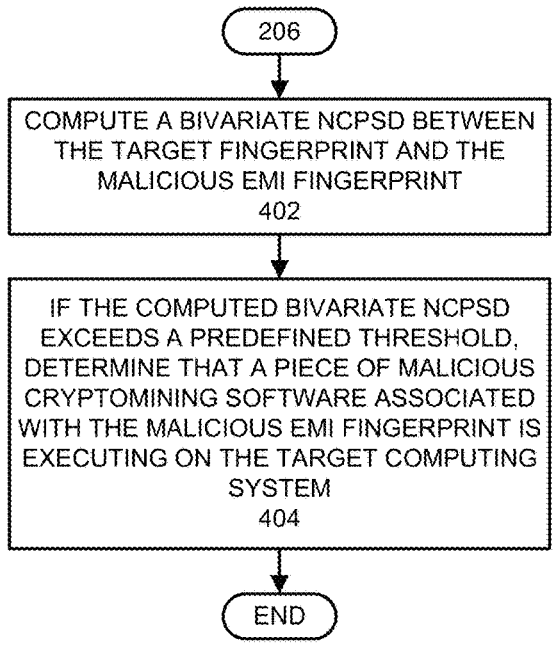
FIG. 4 presents a flow chart illustrating a process for comparing a target EMI fingerprint against a malicious EMI fingerprint in accordance with the disclosed embodiments.

FIG. 4 presents a flow chart illustrating a process for comparing a target EMI fingerprint against a malicious EMI fingerprint in accordance with the disclosed embodiments. (This flow chart illustrates in more detail the operations performed for each malicious fingerprint in step 206 in the flow chart that appears in FIG. 2.) During this process, the system computes a bivariate NCPSD between the target fingerprint and the malicious EMI fingerprint (step 402). Then, if the computed bivariate NCPSD exceeds a predefined threshold, the system determines that a piece of malicious cryptomining software associated with the malicious EMI fingerprint is executing on the target computing system (step 404).

Figure 5:
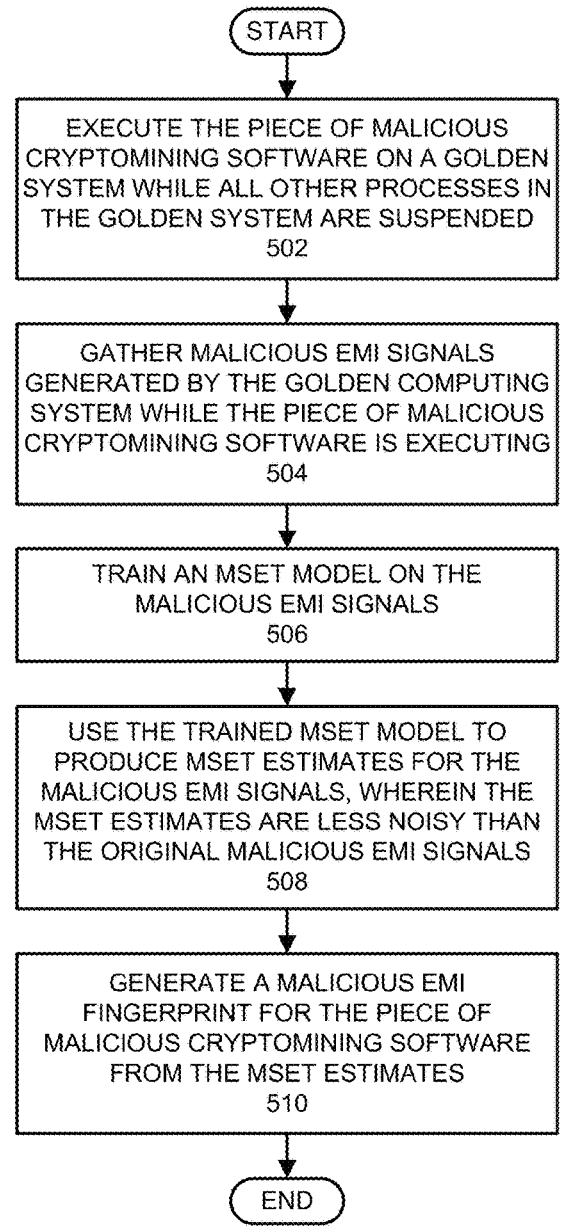
FIG. 5 presents a flow chart illustrating a process for generating the set of malicious EMI fingerprints in accordance with the disclosed embodiments.

FIG. 5 presents a flow chart illustrating a process for generating the set of EMI fingerprints in accordance with the disclosed embodiments. During this process, for each of the different pieces of malicious cryptomining software, the system first executes the piece of malicious cryptomining software on a golden system while all other processes in the golden system are suspended (step 502). Next, the system gathers malicious EMI signals generated by the golden computing system while the piece of malicious cryptomining software is executing (step 504). The system then trains an MSET model on the malicious EMI signals (step 506). Next, the system uses the trained MSET model to produce MSET estimates for the malicious EMI signals, wherein the MSET estimates are less noisy than the original malicious EMI signals (step 508). Finally, the system generates a malicious EMI fingerprint for the piece of malicious cryptomining software from the MSET estimates (step 510).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for detecting execution of malicious cryptomining software in a target computing system, the method comprising:
    monitoring target electromagnetic interference (EMI) signals generated during operation of the target computing system;
    generating a target EMI fingerprint from the target EMI signals; and
    comparing the target EMI fingerprint against a set of malicious EMI fingerprints for different pieces of malicious cryptomining software to determine whether the target computing system is executing malicious cryptomining software;
    wherein comparing the target EMI fingerprint against each malicious EMI fingerprint in the set of malicious EMI fingerprints involves:
        computing a bivariate normalized cross power spectral density (NCPSD) between the target EMI fingerprint and the malicious EMI fingerprint; and
        when the computed bivariate NCPSD exceeds a predefined threshold, determining that a piece of malicious cryptomining software associated with the malicious EMI fingerprint is executing on the target computing system.

2. The method of claim 1, wherein generating the target EMI fingerprint from the EMI signals involves:
    performing a Fast Fourier Transform (FFT) operation on the target EMI signals to transform the target EMI signals from a time-domain representation to a frequency-domain representation;
    partitioning an output of the FFT operation into a set of frequency bins;
    constructing an amplitude time-series signal for each frequency bin in the set of frequency bins; and
    generating the target EMI fingerprint by combining the amplitude time-series signals for all of the frequency bins in the set of frequency bins.

3. The method of claim 1, wherein prior to monitoring the EMI signals, the method further comprises generating the set of EMI fingerprints by performing the following operations for each of the different pieces of malicious cryptomining software:
    executing the piece of malicious cryptomining software on a golden system while all other processes in the golden system are suspended;
    gathering malicious EMI signals generated by the golden computing system while the piece of malicious cryptomining software is executing; and
    generating a malicious EMI fingerprint for the piece of malicious cryptomining software from the gathered EMI signals.

4. The method of claim 3, wherein after gathering the malicious EMI signals for a given piece of malicious cryptomining software and prior to generating the associated malicious fingerprint, the method further comprises:
    training a Multivariate State Estimation Technique (MSET) model on the malicious EMI signals;
    using the trained MSET model to produce MSET estimates for the malicious EMI signals, wherein the MSET estimates are less noisy than the original malicious EMI signals; and
    using the MSET estimates while generating the associated malicious fingerprint.

5. The method of claim 1, wherein the EMI signals are monitored using an insertable device, which is inserted into the target computing system to gather the EMI signals from the target computing system.

6. The method of claim 5, wherein the insertable device gathers the target EMI signals through ground lines or other signal lines in the target computing system, or through a fixed antenna structure in the insertable device, which is optimized for a specific frequency range.

7. The method of claim 5, wherein the insertable device comprises one of the following:
    a universal serial bus (USB) dongle, which is insertable into a USB port in the target computing system;
    a peripheral component interconnect (PCI) card, which is insertable into a PCI slot in the target computing system; and
    a hard-disk drive (HDD) filler package, which is insertable into an HDD slot in the target computing system.

8. The method of claim 5, wherein the insertable device includes a software-defined radio (SDR) for communicating the target EMI signals with a data-acquisition unit.

9. A non-transitory, computer-readable storage medium storing instructions that when executed by a computer cause the computer to perform a method for detecting execution of malicious cryptomining software in a target computing system, the instructions comprising:
  instructions for obtaining target EMI signals generated during operation of the target computing system;
  instructions for generating a target EMI fingerprint from the target EMI signals; and
  instructions for comparing the target EMI fingerprint against a set of malicious EMI fingerprints for different pieces of malicious cryptomining software to determine whether the target computing system is executing malicious cryptomining software;
  wherein comparing the target EMI fingerprint against each malicious EMI fingerprint in the set of malicious EMI fingerprints involves:
  computing a bivariate normalized cross power spectral density (NCPSD) between the target EMI fingerprint and the malicious EMI fingerprint; and
  when the computed bivariate NCPSD exceeds a predefined threshold, determining that a piece of malicious cryptomining software associated with the malicious EMI fingerprint is executing on the target computing system.

10. The non-transitory, computer-readable storage medium of claim 9, wherein generating the target EMI fingerprint from the EMI signals involves:
  performing a Fast Fourier Transform (FFT) operation on the target EMI signals to transform the target EMI signals from a time-domain representation to a frequency-domain representation;
  partitioning an output of the FFT operation into a set of frequency bins;
  constructing an amplitude time-series signal for each frequency bin in the set of frequency bins; and
  generating the target EMI fingerprint by combining the amplitude time-series signals for all of the frequency bins in the set of frequency bins.

11. The non-transitory, computer-readable storage medium of claim 9, wherein the instructions further comprise instructions for, prior to monitoring the EMI signals, generating the set of EMI fingerprints by performing the following operations for each of the different pieces of malicious cryptomining software:
  executing the piece of malicious cryptomining software on a golden system while all other processes in the golden system are suspended;
  gathering malicious EMI signals generated by the golden computing system while the piece of malicious cryptomining software is executing; and
  generating a malicious EMI fingerprint for the piece of malicious cryptomining software from the gathered EMI signals.

12. The non-transitory, computer-readable storage medium of claim 11, wherein the instructions further comprise instructions for, after gathering the malicious EMI signals for a given piece of malicious cryptomining software and prior to generating the associated malicious fingerprint:
  training a Multivariate State Estimation Technique (MSET) model on the malicious EMI signals;
  using the trained MSET model to produce MSET estimates for the malicious EMI signals, wherein the MSET estimates are less noisy than the original malicious EMI signals; and
  using the MSET estimates while generating the associated malicious fingerprint.

13. The non-transitory, computer-readable storage medium of claim 9, wherein the EMI signals are monitored using an insertable device, which is inserted into the target computing system to gather the EMI signals from the target computing system.

14. The non-transitory, computer-readable storage medium of claim 13, wherein the insertable device comprises one of the following:
  a universal serial bus (USB) dongle, which is insertable into a USB port in the target computing system;
  a peripheral component interconnect (PCI) card, which is insertable into a PCI slot in the target computing system; and
  a hard-disk drive (HDD) filler package, which is insertable into an HDD slot in the target computing system.

15. A system that detects execution of malicious cryptomining software in a target computing system, comprising:
  at least one processor and at least one associated memory; and
  a detection mechanism that executes on the at least one processor, wherein the detection mechanism:
    monitors target EMI signals generated during operation of the target computing system,
    generates a target EMI fingerprint from the target EMI signals, and
    compares the target EMI fingerprint against a set of malicious EMI fingerprints for different pieces of malicious cryptomining software to determine whether the target computing system is executing malicious cryptomining software;
  wherein comparing the target EMI fingerprint against each malicious EMI fingerprint in the set of malicious EMI fingerprints involves:
  computing a bivariate normalized cross power spectral density (NCPSD) between the target EMI fingerprint and the malicious EMI fingerprint; and when the computed bivariate NCPSD exceeds a predefined threshold, determining that a piece of malicious cryptomining software associated with the malicious EMI fingerprint is executing on the target computing system.

16. The system of claim 15, wherein while generating the target EMI fingerprint from the EMI signals, the detection mechanism:
  performs a Fast Fourier Transform (FFT) operation on the target EMI signals to transform the target EMI signals from a time-domain representation to a frequency-domain representation;
  partitions an output of the FFT operation into a set of frequency bins;
  constructs an amplitude time-series signal for each frequency bin in the set of frequency bins; and
  generates the target EMI fingerprint by combining the amplitude time-series signals for all of the frequency bins in the set of frequency bins.

17. The system of claim 15, wherein prior to monitoring the EMI signals, the detection mechanism generates the set of EMI fingerprints, during this process, for each of the different pieces of malicious cryptomining software, and wherein the detection mechanism:
  executes the piece of malicious cryptomining software on a golden system while all other processes in the golden system are suspended;
  gathers malicious EMI signals generated by the golden computing system while the piece of malicious cryptomining software is executing; and
  generates a malicious EMI fingerprint for the piece of malicious cryptomining software from the gathered EMI signals.

18. The system of claim 17, wherein after gathering the malicious EMI signals for a given piece of malicious cryptomining software and prior to generating the associated malicious fingerprint, the detection mechanism:
- trains a Multivariate State Estimation Technique (MSET) model on the malicious EMI signals;
- uses the trained MSET model to produce MSET estimates for the malicious EMI signals, wherein the MSET estimates are less noisy than the original malicious EMI signals; and
- uses the MSET estimates while generating the associated malicious fingerprint.

19. The system of claim 15, wherein the EMI signals are monitored using an insertable device, which is inserted into the target computing system to gather the EMI signals from the target computing system.

20. The system of claim 19, wherein the insertable device comprises one of the following:
- a universal serial bus (USB) dongle, which is insertable into a USB port in the target computing system;
- a peripheral component interconnect (PCI) card, which is insertable into a PCI slot in the target computing system; and
- a hard-disk drive (HDD) filler package, which is insertable into an HDD slot in the target computing system.

* * * * *